United States Patent
Chen (10) Patent No.: US 7,464,126 B2
(45) Date of Patent: Dec. 9, 2008

(54) METHOD FOR CREATING AN APPLICATION-CONSISTENT REMOTE COPY OF DATA USING REMOTE MIRRORING

(75) Inventor: Ying Chen, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 385 days.

(21) Appl. No.: 11/186,189

(22) Filed: Jul. 21, 2005

(65) Prior Publication Data

US 2007/0022144 A1 Jan. 25, 2007

(51) Int. Cl.
*G06F 12/00* (2006.01)
*G06F 17/30* (2006.01)
*G06F 7/00* (2006.01)

(52) U.S. Cl. .......................... 707/204; 707/102; 714/6
(58) Field of Classification Search ................. 707/204; 714/6
See application file for complete search history.

(56) References Cited

U.S. PATENT DOCUMENTS

| | | | |
|---|---|---|---|
| 5,758,125 A | 5/1998 | Misinai et al. | |
| 5,926,833 A | 7/1999 | Rasoulian et al. | |
| 6,145,006 A | 11/2000 | Vishlitsky et al. | |
| 6,199,074 B1 * | 3/2001 | Kern et al. | 707/204 |
| 6,324,654 B1 * | 11/2001 | Wahl et al. | 714/6 |
| 6,473,774 B1 * | 10/2002 | Cellis et al. | 707/200 |
| 6,502,205 B1 * | 12/2002 | Yanai et al. | 714/7 |
| 6,877,016 B1 * | 4/2005 | Hart et al. | 707/201 |
| 6,879,981 B2 | 4/2005 | Rothschild et al. | |
| 7,197,615 B2 * | 3/2007 | Arakawa et al. | 711/162 |
| 7,242,772 B1 * | 7/2007 | Tehranchi | 380/223 |
| 2002/0016827 A1 * | 2/2002 | McCabe et al. | 709/213 |
| 2003/0055972 A1 | 3/2003 | Fuller et al. | |
| 2003/0056084 A1 | 3/2003 | Holgate et al. | |
| 2003/0145114 A1 | 7/2003 | Gertner | |
| 2003/0145168 A1 * | 7/2003 | LeCrone et al. | 711/114 |
| 2003/0154236 A1 | 8/2003 | Dar et al. | |
| 2003/0233510 A1 | 12/2003 | Umbehocker et al. | |
| 2004/0122917 A1 | 6/2004 | Menon et al. | |
| 2004/0139141 A1 | 7/2004 | Lessard | |
| 2004/0172509 A1 * | 9/2004 | Takeda et al. | 711/162 |
| 2005/0216658 A1 * | 9/2005 | Muto et al. | 711/113 |
| 2005/0273614 A1 * | 12/2005 | Ahuja et al. | 713/176 |

(Continued)

OTHER PUBLICATIONS

A. Muthitacharoen, B. Chen, and D. Mazieres. A low-bandwidth network file system. In Proc. 18th SOSP, pp. 174-187, Oct. 2001.*

(Continued)

*Primary Examiner*—Pierre M. Vital
*Assistant Examiner*—Vei-Chung Liang
(74) *Attorney, Agent, or Firm*—Shimokaji + Associates, P.C.

(57) ABSTRACT

An application consistent data protection method provides application-assist and replication-technology neutral mirroring that ensures that a remote data copy is application-consistent. The method comprises a coordination protocol to coordinate application hosts across heterogeneous hosts and heterogeneous storage devices. The method utilizes a disk layout and data record format that enables use of an underlying replication ability of a storage device, minimizing development cost and utilizing customer investment. The method comprises on-demand consistency point initiation to minimize performance impact and maximize system resource usage. The method can be applied to both synchronous and asynchronous mirroring and can be incorporated into any virtualization device.

17 Claims, 7 Drawing Sheets

U.S. PATENT DOCUMENTS

| | | | |
|---|---|---|---|
| 2005/0289152 A1* | 12/2005 | Earl et al. | 707/100 |
| 2006/0069887 A1* | 3/2006 | LeCrone et al. | 711/162 |
| 2006/0130154 A1* | 6/2006 | Lam et al. | 726/30 |
| 2006/0136685 A1* | 6/2006 | Griv et al. | 711/162 |
| 2006/0179343 A1* | 8/2006 | Kitamura | 714/6 |
| 2006/0184587 A1* | 8/2006 | Federwisch et al. | 707/200 |
| 2006/0190606 A1* | 8/2006 | Kohavi | 709/226 |

OTHER PUBLICATIONS

L. P. Cox and B. D. Noble. Pastiche: Making backup cheap and easy. In Proceedings of Fifth USENIX Symposium on Operating Systems Design and Implementation, Boston, MA, Dec. 2002.*

"Kashya KBX5000 Ready To Go The Distance," ProductProfile-KBX5000-2, pp. 1-4, 2003.

"Legal Requirements for DataRetention and Recovery in theFinancial Industry," pp. 1-11, 2003.

"IBM TotalStorage Enterprise Storage ServerImplementing ESS Copy Services in Open Environments," Chapter 1.8, 2004.

"Symmetrix Remote Data Facility (SRDF)Product Description Guide," 2000.

* cited by examiner

METHOD FOR CREATING AN APPLICATION-CONSISTENT REMOTE COPY OF DATA USING REMOTE MIRRORING

FIELD OF THE INVENTION

The present invention generally relates to the field of data protection and backup, and in particular, to protecting data through remote mirroring in an integrated system that comprises heterogeneous hosts and heterogeneous storage devices.

BACKGROUND OF THE INVENTION

Data protection is critical to businesses. It has becoming an even more so in light of regulatory compliant requirements. The Security Exchange Commission of the United States recommends business to recover within 24 hours after a system failure. This requirement for disaster recovery and backup drives a demand for advanced data protection technologies. The differentiation in such technologies can be crucial to vendors as well as to customers. Various conventional data protection solutions exist today in the market place, ranging from backup to remote mirroring. Further, many data storage devices and data storage products include data protection features.

A given business solution often comprises integrated software components running on heterogeneous hosts and heterogeneous storage devices. This business solution may use several different types of applications and systems and access several different types of storage devices. There is a significant need to ensure high availability of such business solutions. The existing solutions range from taking frequent backups to remote mirroring. However, conventional technologies do not ensure an application-consistent remote data copy for such a solution. That is, the remote data copies often do not reflect the state of more than one heterogeneous pieces of software precisely coordinated in time across all affected storage resources and hosts. Consequently, the remote copy may be useless, or very difficult and expensive to return to service, if that copy is ever needed.

Although conventional data protection technology has proven to be useful, it would be desirable to present additional improvements. Currently, information technology environments comprise a growing number of solutions that operate across numerous heterogeneous hosts and storage devices. To enable businesses to meet Security Exchange Commission regulations and quickly to recover from system disasters or failures, data protection techniques are required to function across numerous hosts and storage devices. These data protection techniques are further required to ensure an application-consistent remote data copy that allows the entire solution as a whole to be restored after failure.

For example, consider a software infrastructure that supports an integrated supply chain or an extended virtual collaboration among numerous enterprises to provide services to an end customer, such as an auto manufacturer and its parts suppliers and transportation vendors. When a transaction is committed, the commitments of all parties comprising the virtual supply chain are written to persistent storage to represent an application-level consistency point; i.e., a point in time at which a stored set of data is considered consistent for all applications using the data. If the remote data copy does not reflect such a consistency point, that data copy may be useless.

Such application-consistency data protection support requires application participation, yet today there is no replication infrastructure that aids such application coordination. Creating a conventional consistency point in remote or local backup copies is often performed manually or through expensive services. Furthermore, conventional replication or backup technologies are often application-specific and storage device dependent. That is, some conventional technology support may utilize specific application knowledge to generate a consistency point. However, such solutions are often not applicable to other applications. Application internal changes may invalidate the specific technology support altogether. Conventional individual storage devices may provide mirroring capabilities, but there is no "replication infrastructure manager" operating across all these storage devices that can provide overall application consistency.

Some attempts have been made in various mirroring solutions to address different aspects of the above problem. One conventional technology has some support to ensure data consistency from a storage device point of view at the remote site, when the local data is stored across a set of logical unit numbers Logical Unit Numbers (LUNs). A LUN is also used to refer to a logical disk partition. A LUN is essentially a portion of a physical disk. A set of LUNs typically means a set of logical disk partitions.

A conventional approach groups such LUNs so that the write ordering seen at these LUNs can be preserved at the remote site as well. This conventional approach guarantees that the remote copy always corresponds to some consistent point-in-time copy at the local site. However, this conventional approach does not guarantee application level consistency if the application runs across numerous such storage devices. If replication is performed at a storage virtualization layer, this conventional approach can potentially deal with the issue of operating with numerous heterogeneous storage boxes. However, there is still a need for this conventional approach to coordinate with applications to form a consistency point.

Therefore, there remains a need for an efficient and low-cost data protection method to provide application level consistency for remote data copies in a system comprising heterogeneous hosts or heterogeneous storage devices. What is therefore needed is a system, a computer program product, and an associated method for creating an application-consistent remote copy of data using remote mirroring. The need for such a solution has heretofore remained unsatisfied.

SUMMARY OF THE INVENTION

In one aspect of the present invention, a method of creating an application-consistent remote copy of data using remote mirroring, comprising of registering at least one of a plurality of application hosts associated with the application as an application-consistent host group, intercepting a write request from at least one of a plurality of the application hosts, appending the intercepted write request as a write record in a write record format to a local log in a local replication volume; the record format comprising content-dependent hash head and tail signatures and at least one uniquely verifiable data field, instructing the application hosts to prepare a consistency point; the preparation including at least quiescing application updates, generating a consistency point record to identify a set of write records comprising a consistency point data set; the consistency point being appended to the write record, replicating the write records and the consistency point records to a remote log in a remote replication volume; the records being written in a consecutive region of the remote log, scanning the remote log for the consistency point record until all the data associated with the consistency point has been replicated, verifying the validity of a content of each of the write records in the remote log, the validity being determined based on criteria selected from the group consisting of: valid value boundaries, the hashed head and tail signatures and a sequence number contained in one of the at least one uniquely verifiable data fields, generating a validated consistency point update transaction after all of the write records have been replicated and validated, the validated consistency point record including at least a last sequence number generated; and writing the validated write packets in a sequential fashion and the validated consistency point update transaction to a remote storage device to generate an application-consistent remote copy of the consistency point data set, the validated write packets being written in a fashion independent of a manner in which the write packets were replicated.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Consistency Point Data Set: A set of records or updates associated with a consistency point.

Consistency Point Update Transaction: a validated consistency point data set processed for writing to remote storage.

Consistency Point: A point in time at which a set of data is considered consistent for all application hosts using the data.

Consistency Point Record: a record generated at a consistency point identifying a consistency point data set.

Figure 1:
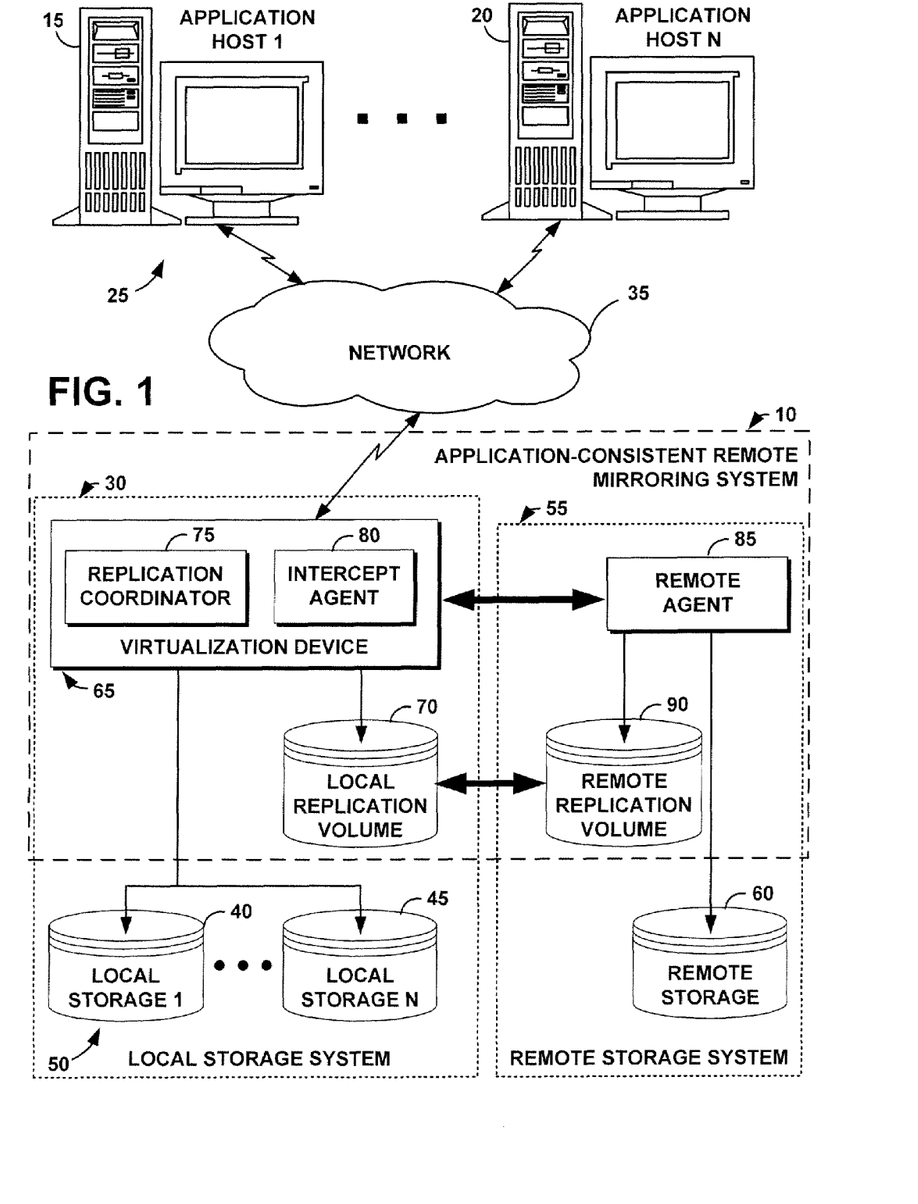
FIG. 1 is a schematic illustration of an exemplary operating environment in which an application-consistent remote mirroring system of the present invention can be used.

FIG. 1 portrays an exemplary overall environment in which a system, a computer program product, and an associated method for creating an application-consistent remote copy of data using remote mirroring (the "system 10") according to the present invention may be used. System 10 comprises a software programming code or a computer program product that is typically embedded within, or installed on a computer, a switching device, or any layer or point residing between hosts and storage devices. For example, system 10 can be installed in a virtualization file system, a virtualization layer, or a virtualization storage-switching device. Alternatively, system 10 can be saved on a suitable storage medium such as a diskette, a CD, a hard drive, or like devices.

Hosts, such as an application host 1, 15, through an application host N, 20, (collectively referenced as application hosts 25) access a local storage system 30 through a network 35. The local storage system 30 comprises storage devices such as a local storage 1, 40, through a local storage N, 45, (collectively referenced as local storage devices 50). While system 10 is described in terms of network 35, application hosts 25 may also access the local storage system 30 and system 10 locally rather than remotely.

System 10 replicates data stored in the local storage devices 50 to a remote storage system 55. The remote storage system 55 comprises a storage device such as a remote storage 60 (interchangeably referenced as a remote storage device 60). While the remote storage device 60 is shown as one storage device, the remote storage device 60 can comprise additional storage devices. Furthermore, while system 10 is described in terms of the local storage devices 50 and the remote storage device 60, the terms "local" and "remote" are used to distinguish the local storage devices 50 from the remote storage device 60 and not to limit application of system 10. The remote storage device 60 may reside locally with the local storage devices 50 or remotely, apart from the local storage devices 50.

The local storage system 30 and the remote storage system 55 comprise system 10. System 10 on the local storage system 30 comprises a virtualization device 65 and a local replication volume 70. The virtualization device 65 comprises a replication coordinator 75 and an intercept agent 80. The replication coordinator 75 is responsible for coordinating among the application hosts 25, the local storage devices 50, and the remote storage device 60 to generate a consistency point. System 10 on the remote storage system 55 comprises a remote agent 85 and a remote replication volume 90.

According to another embodiment, the replication volume 70 does not form part of system 10. Rather, the replication volume 70 can be part of local storage devices 50 or the remote storage device 60.

During an initial system setup time, a registration phase informs the replication coordinator 75 which of the application hosts 25 are included in the generation of a consistency point; these application hosts 25 are referenced as an application-consistent host group.

In one embodiment, the local replication volume 70 is a storage volume allocated from the local storage devices 50. When allocated from the local storage devices 50, the local storage devices 50 require some form of replication or remote mirroring capability such as, for example, synchronous mirroring or asynchronous mirroring. In another embodiment, the local replication volume 70 is a separate storage device. In one embodiment, the remote replication volume 90 is a storage volume allocated from the remote storage device 60. In another embodiment, the remote replication volume 90 is a separate storage device.

The data written to the local replication volume 70 is contiguously replicated to the remote replication volume 90 using any replication mechanism existing in the local replication volume 70. In one embodiment, the local replication volume 70 is a storage volume allocated from the local storage devices 50; in this case, the data written to the local replication volume 70 is contiguously replicated to the remote replication volume 90 using any replication mechanism existing in the local storage devices 50.

The remote replication volume 90 maintains the data replicated from the local replication volume 70. The remote storage device 60 maintains a remote data copy. The remote agent 85 reads and processes the data in the remote replication volume 90 to extract valid data. The remote agent 85 further generates an application-consistent data copy in the remote storage device 60. The replication mechanism used in the local storage devices 50 may replicate data blocks in the local replication volume 70 in an order other than the order the data was written. Consequently, the remote replication volume 90 may receive more recent data before older data. System 10 comprises a disk layout in the local replication volume 70 and the remote replication volume 90 and a record format for data stored in the local replication volume 70 and the remote replication volume 90 that allows the remote agent 85 to extract correct data even in case of out-of-order data replication.

When the remote agent 85 processes the remote replication volume 90 to extract valid data, the remote agent 85 may encounter holes. Holes are disk regions that contain garbage data; i.e., the data that is to occupy the hole has not yet been replicated. The disk layout in the local replication volume 70 and the remote replication volume 90 and a record format for data stored in the local replication volume 70 and the remote replication volume 90 allows the remote agent 85 to detect holes and extract valid data.

Figure 2:
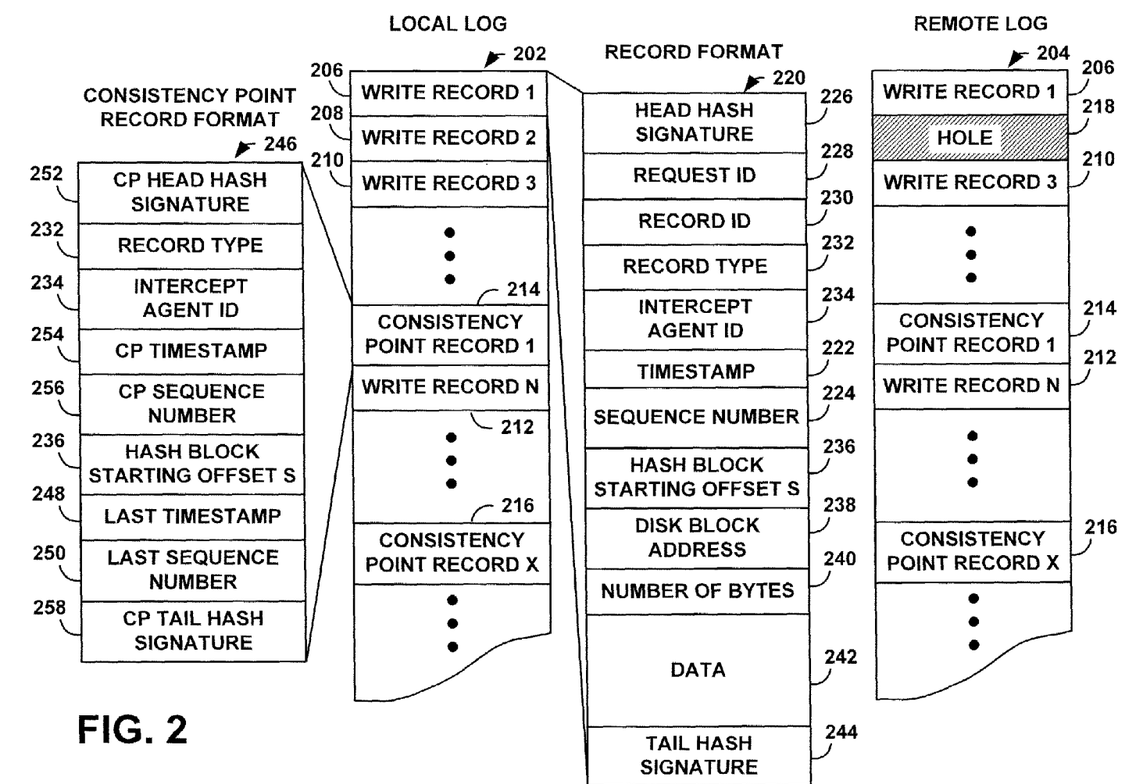
FIG. 2 is a diagram illustrating an append-only circular log disk format, a record format, and a consistency point format used by the application-consistent remote mirroring system of FIG. 1 to generate an application-consistent remote copy of data.

The disk layout of the local replication volume 70 and the remote replication volume 90 enables each to behave as an append-only circular log. FIG. 2 illustrates a diagram of a local log 202 on the local replication volume 70 configured in an append-only circular log format. FIG. 2 further illustrates a diagram of a remote log 204 on the remote replication volume 90 configured in an append-only circular log format. The intercept agent 80 writes each piece of data to an end of the local log 202 in the local replication volume 70.

The local log 202 comprises write records such as, for example, write record 1, 206, write record 2, 208, write record 3, 210, through write record N, 212. The local log further comprises consistency point records such as, for example, consistency point record 1, 214, and consistency paint record X, 216. The intercept agent 80 writes write record 1, 206, in the local log 202- The intercept agent 80 then appends write record 2, 208, to the end of write record 1, 206, and appends write record 3, 210 to the end of write record 2, 208, etc. System 10 periodically generates consistency points such as consistency point record 1,212, through consistency point record X, 216, to maintain application consistency between the local storage devices 50 and the remote storage device 60 while minimizing the amount of storage required for the local replication volume 70 and the remote replication volume 90.

A replication technology replicates records from the local log 202 on the local replication volume 70 to the remote log 204 on the remote replication volume 90. As an example, the replication technology may replicate write record 1, 206, and write record 3, 210, but delay replicating write record 2, 208. Consequently, a space where write record 2, 208, resides in remote log 204 is instead a hole 218. The process of system 10 in generating a consistency point enables system 10 to identify holes such as hole 218 and wait until all data associated with a consistency point (the consistency point data set) has been replicated before the consistency point data set is written to the remote storage device 60.

The intercept agent 80 writes the data in a data record format known to the remote agent 85, illustrated as a record format 220. The record format 220 comprises a timestamp 222 and a sequentially increasing sequence number 224 generated by the intercept agent 80. Timestamp 222 and the sequence number 224 identify the specific write record. The record format 220 further comprises a head hash signature 226, a request ID 228, a record ID 230, a record type 232, an intercept agent ID 234, a hash block starting offset S, 236, a disk block address 238, a number of bytes 240 in the write request, data 242 in the write request (interchangeable referenced herein as an update or an update request), and a tail hash signature 244. The record format 220 further comprises a request ID 228.

The head hash signature 226 represents a head of a write request; the tail hash signature 244 represents a tail of the write request. The head hash signature 226 matches the tail hash signature 244. The head hash signature 226 and the tail hash signature 244 are computed as a hash of timestamp 222, the sequence number 224, the intercept agent ID 234, and some N bytes of the data 242 starting at the hash block starting offset S, 236, for example, at an 8th byte in the data 242. The value of N is dynamically configurable, ranging from 0 to the number of bytes 240. The amount of computation required for the head hash signature 226 and the tail hash signature 244 is proportional to the value of N. The probability of experiencing a hash collision is inversely proportional to the value of N. In practice, system 10 can configure an N to ensure that the probability of a hash collision is negligible. The value of N s randomly generated by system 10.

The request ID 228 indicates whether the write represented by the record format 220 is a write record or a consistency point record. When a consistency point data set is formed, system 10 writes a consistency point record to the local replication volume 70 to indicate that a consistency point has been declared. The intercept agent 80 generates timestamp 222; timestamp 222 is always increasing. For each write request initiated by one of the application hosts 25, the intercept agent 80 generates a next number in a sequence for the sequence number 224; the sequence number increases sequentially.

The disk block address 238 is the disk location where the data corresponding to a write record is stored when written to the remote storage device 60. The record format 220 enables the remote agent 85 to distinguish valid data from holes such as hole 218. The record format 220 allows numerous checks on a single record to verify validity of the record. Such verification makes it difficult to mistakenly identify a valid piece of data as a hole. The head hash signature 226 and the tail hash signature 244 can be computed using an available hash function such as, for example, MD5 or SHA-I.

Periodically, the replication coordinator 75 communicates with the application hosts 25 to declare an application consistency point. A consistency point record is then formed in a consistency point record format 246 and appended to the end of the local log 202 in the local replication volume 70. Exemplary consistency point records in local log 202 are consistency point record 1, 214 and consistency point record X, 216. The consistency point record format 246 comprises a fast timestamp 248 and a last sequence number 250 generated by the intercept agent 80 prior to formation of the consistency point record.

The last timestamp 248 and the last sequence number 250 indicates that a consistency point record has been formed for all write records prior to the consistency point that have not yet been included in a consistency point data set. Any write records that occurred between the consistency point and an immediately previous consistency point form a consistency point data set. All such write records comprise sequence numbers smaller than or equal to the last sequence number 250. All write records in one consistency point data set are applied atomically to the remote storage device 60 to ensure application consistency.

The consistency point record format 246 further comprises a consistency point (CP) head hash signature 252, the record type 232, the intercept agent ID 234, a consistency point (CP) timestamp 254, a consistency point (CP) sequence number 256, the hash block starting offset S, 236, and a consistency point (CP) tail hash signature 258. The CP head hash signature 252 and the CP tail hash signature 258 are computed over data in the consistency point in a manner similar to that of the head hash signature 226 and the tail hash signature 244.

Write records and consistency points are appended to the end of the local log 202 in the local replication volume 70. Consequently, the disk layout in the local replication volume 70 and the remote replication volume 90 comprises several properties. Write records in a consistency point data set occupy a consecutive region of the disk space in the local replication volume 70 and the remote replication volume 90. The sequence number 224 for each of the write records in a consistency point data set is consecutive and increasing compared with the sequence number 224 for the immediately preceding write record. Further, the sequence number 224 in an initial write record following a consistency point increments from the last sequence number in the previously processed consistency point data set.

The remote replication volume 90 is configured similarly to the local replication volume 70; consequently, the remote replication volume 90 comprises similar disk layouts and data records on disks as the local replication volume 70. Provided the remote agent 85 processes the log records of the remote replication volume 90 in a sequential log-scan fashion, the remote agent 85 can extract valid data to generate remote data copies independently of the manner in which the data is replicated between the local replication volume 70 and the remote replication volume 90.

Figure 3:
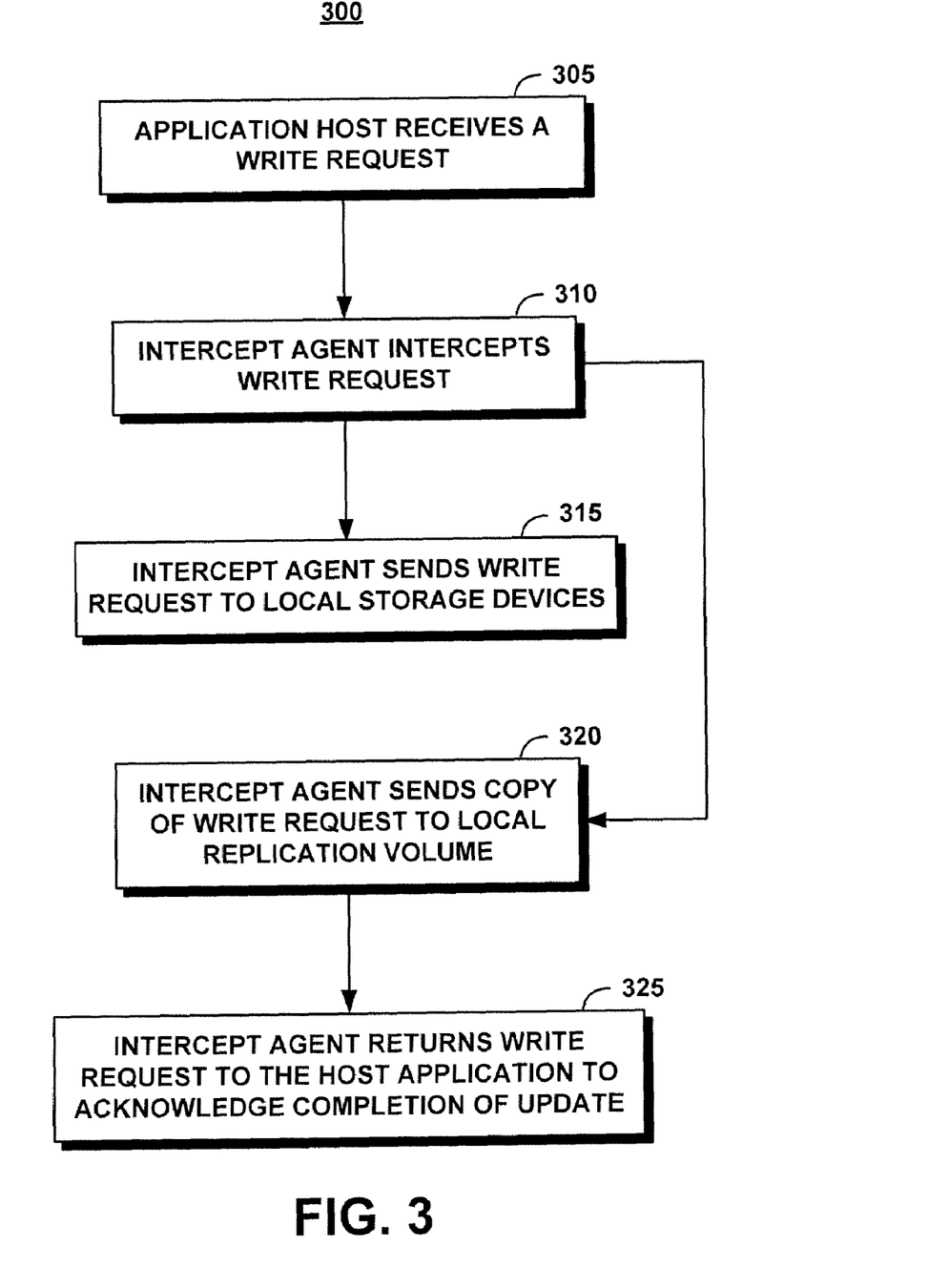
FIG. 3 is a process flow chart illustrating a method of operation of the application-consistent remote mirroring system of FIG. 1 in which updates are written to local storage and to a local replication volume.

FIG. 3 illustrates a method 300 of operation of system 10 in which updates are written to the local storage devices 50 and to the local replication volume 70. One of the application hosts 25 receives a write request for an update (step 305). The intercept agent 80 intercepts the write request passed by the requesting application host 25 to the local storage devices 50 (step 310). As the intercept agent 80 intercepts each write request, the intercept agent 80 sends the write request to a storage device in the local storage devices 50 in the manner of a typical write request (step 315). Concurrently, the intercept agent 80 sends a copy of the write request to the local replication volume 70 (320). The intercept agent 80 returns the write request to the host application to acknowledge completion of the write request (step 325), returning I/O operation to the requesting application host 25 in a handshaking protocol.

Writes by the intercept agent 80 to the local replication volume 70 can be optimized through any available write optimization techniques, such as, for example, non-volatile random access memory (NVRAM) or group commit. The choice of write optimization or mirroring technology is subject to customer requirements for a recovery point objective; i.e., how much data loss can a customer tolerate if a failure occurs. In practice, a significant number of customers prefer a low-cost and efficient replication scheme and can tolerate some amount of data loss provided the remote data copy is consistent and can be brought into action quickly when a failure occurs. For example, asynchronous mirroring exhibits efficient and low cost performance. However, conventional asynchronous mirroring exhibits data consistency problems. System 10 leverages the performance and cost advantages of asynchronous mirroring and ensures application consistency for remote data copies.

To provide application consistency, system 10 comprises the following protocol support: RegisterConsistencyGroup, PrepareConsistencyPoint, and CompleteConsistencyPoint. When the replication sessions are initiated, all application components that belong to an application-consistent host group register with the replication coordinator 75 using the RegisterConsistencyGroup protocol. The RegisterConsistencyGroup protocol enables the replication coordinator 75 to know which application components are involved in an application-consistent host group.

Figure 4A:
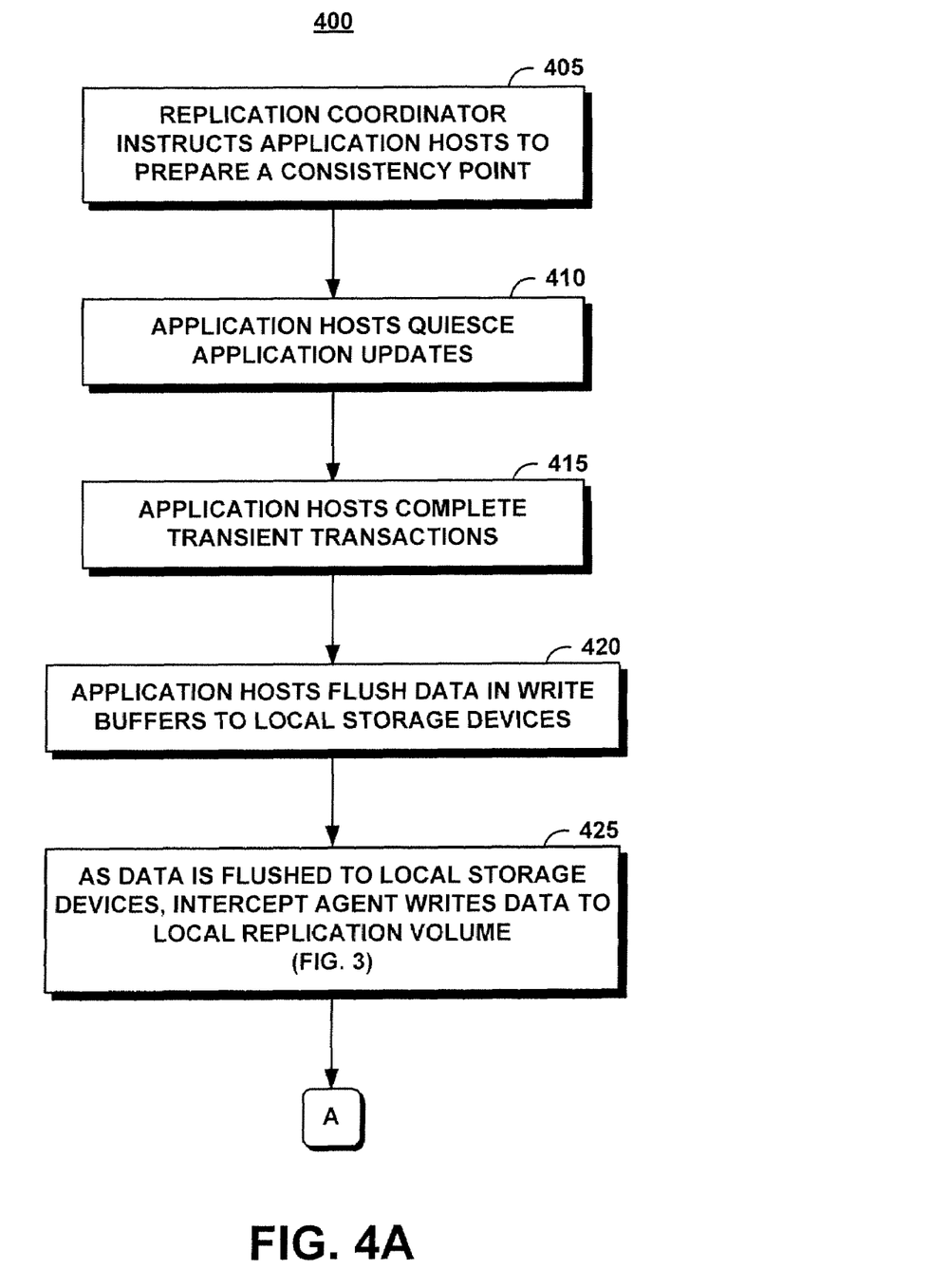
FIG. 4 is comprised of FIGS. 4A and 4B and represents a process flow chart illustrating a method of operation of the application-consistent remote mirroring system of FIG. 1 in which a consistency point is generated to identify and isolate data and updates that are consistent.
Figure 4B:
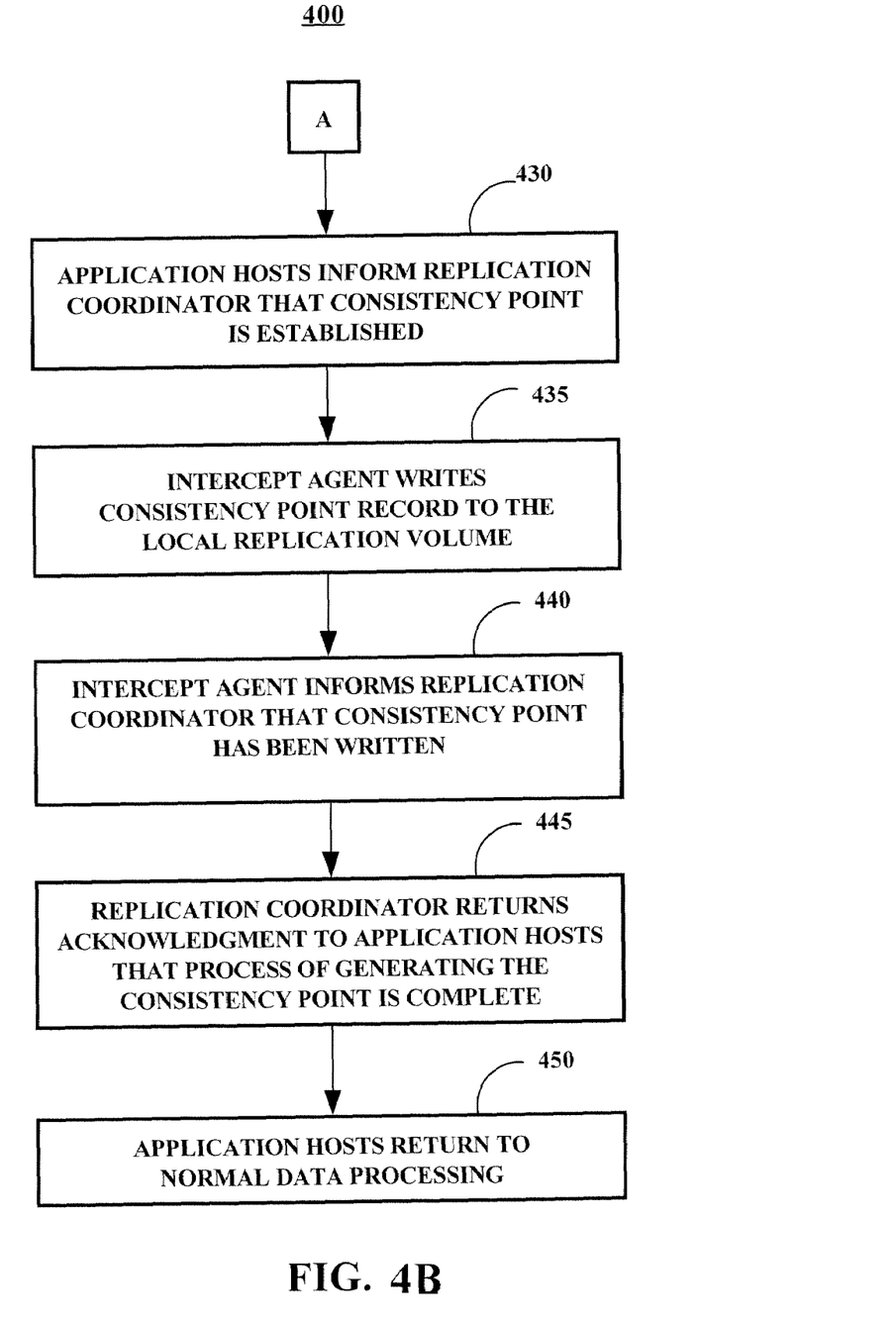

FIG. 4 (FIGS. 4A, 4B) illustrates a method 400 of system 10 in generating a consistency point using the PrepareConsistencyPoint protocol and the CompleteConsistencyPoint protocol. Using the PrepareConsistencyPoint protocol, the replication coordinator 75 instructs the application hosts 25 in an application-consistent host group to prepare a consistency point (step 405). Upon the receipt of the PrepareConsistencyPoint instruction, the application hosts 25 perform a set of consistency point preparation tasks comprising quiescing the application updates (step 410), completing the transient transactions (step 415), and flushing data in write buffers to the local storage devices 50 (step 420) so that a consistent state is established across all coordinating components from the application point of view. Such flushing mechanisms typically exist in applications. Application hosts 25 use these flushing mechanisms to perform the consistency point preparation tasks.

As data is flushed to the local storage devices 50, the intercept agent 80 writes the flushed data to the local replication volume 70 (step 425, as described in method 300, FIG. 3). Once application hosts 25 complete the consistency point preparation tasks, the application hosts 25 use the CompleteConsistencyPoint protocol to inform the replication coordinator 75 that the consistency point is established (step 430). The intercept agent 80 writes a consistency point record to the local replication volume 70 (step 435) and informs the replication coordinator 75 that the consistency point record has been written (step 440). The replication coordinator 75 returns acknowledgment to the application hosts 25 that the process of generating the consistency point is complete (step 445). The application hosts 25 return to normal data processing (step 450).

Figure 5A:
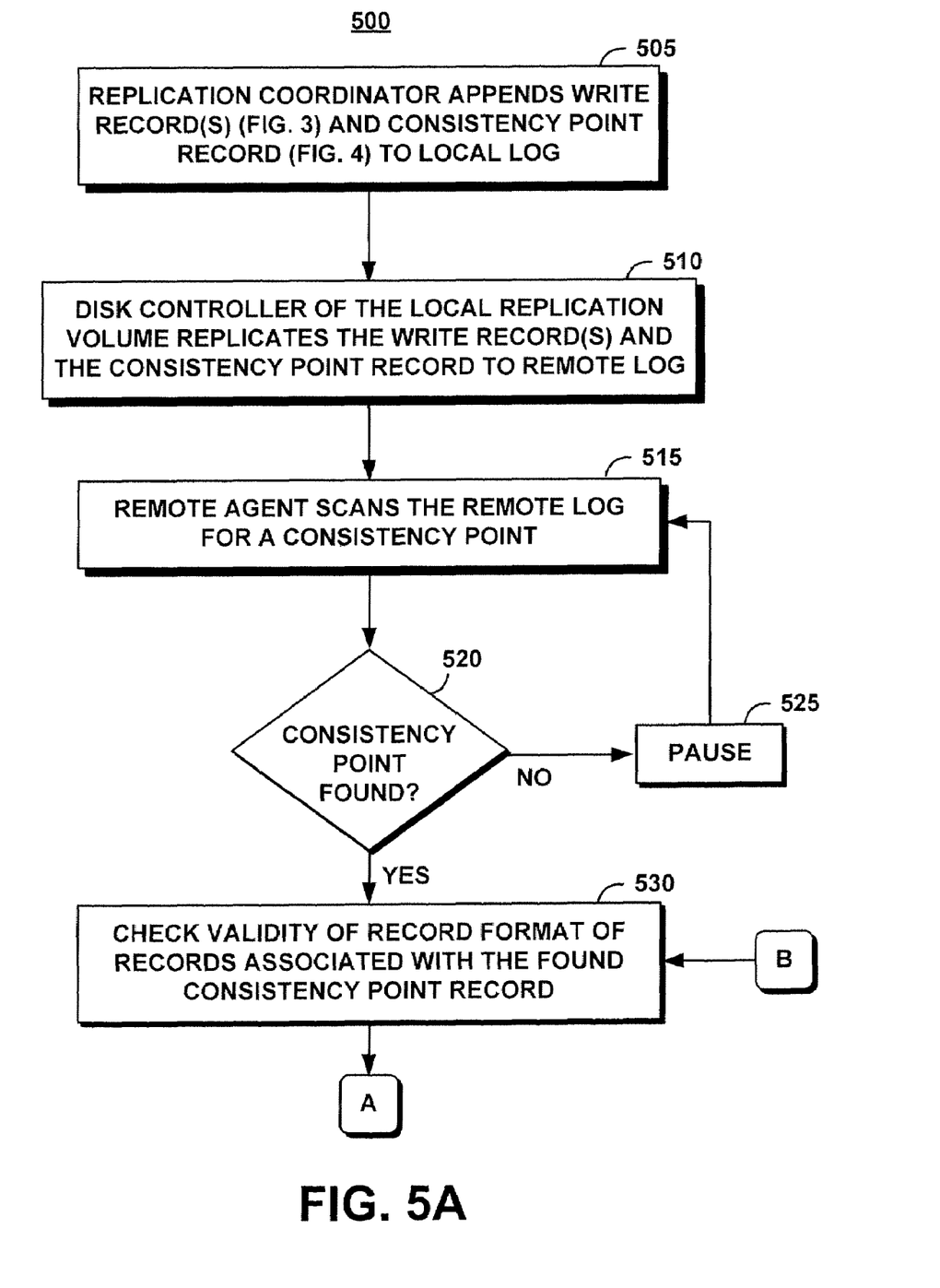
FIG. 5 is comprised of FIGS. 5A and 5B and represents a process flow chart illustrating a method of operation of the application-consistent remote mirroring system of FIG. 1 in which data and updates that are application consistent are written or mirrored to a remote replication volume and a remote storage volume.
Figure 5B:
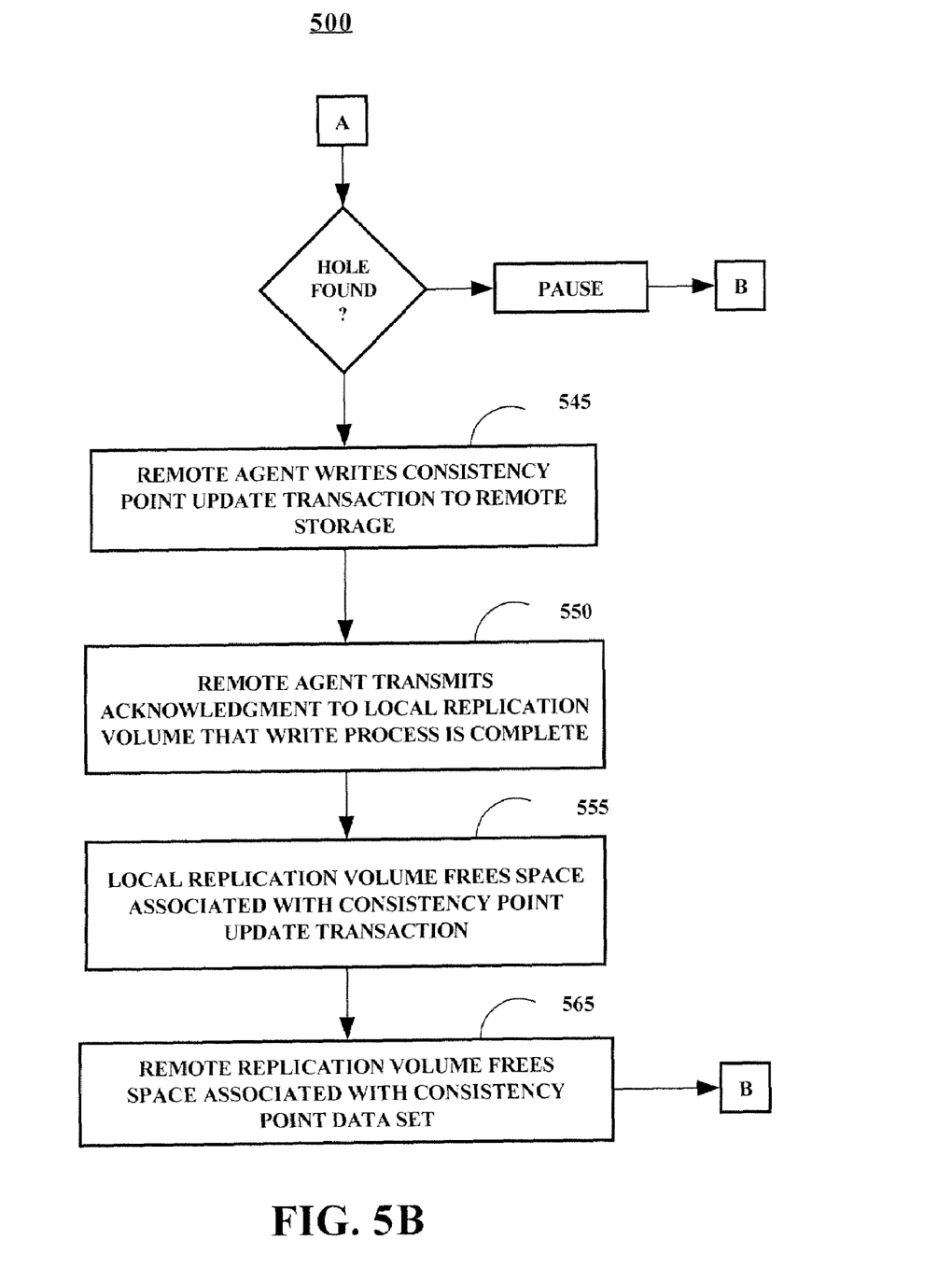

FIG. 5 (FIGS. 5A, 5B) illustrates a method 500 in which application consistent data is written to the remote replication volume 90 and the remote agent 85 replicates data from the remote replication volume 90 to the remote storage device 60. The replication coordinator 75 appends one or more write records and a consistency point record to the local log 202 (step 505, described in FIG. 3 and FIG. 4). A disk controller of the local replication volume 70 replicates the write records and the consistency point record to the remote log 204 in the remote replication volume 90 (step 510). The remote agent 85 contiguously scans the remote log 204, searching for a consistency point (step 515). If a consistency point is not found (decision step 520), the remote agent 85 pauses (step 525), and repeats step 515 through step 525 until a consistency point is found.

When a consistency point is found (decision step 520), the remote agent 85 checks the validity of the record format of write records in the set of data records associated with the found consistency point. The remote agent 85 verifies the write records one at a time against a set of conditions comprising valid value boundaries, hash signatures, and sequence numbers. The remote agent 85 verifies the record format of a selected write record by determining whether values in each of the fields of the record format 220 for the selected write record are within valid value boundaries. The remote agent 85 computes the hash signature for the selected write record and determines whether the hash signature matches the head hash signature 226 for the selected write record.

The remote agent 85 determines whether the head hash signature 226 for the selected write record matches the tail hash signature 244 for the selected write record. The remote agent 85 determines whether the sequence number 224 of the selected write record is larger than the last sequence number 250 of the previous consistency point record; if not, the selected request has already been processed and written to the remote storage device 60. To be considered valid, a selected write record has values that fall within predetermined valid boundaries, has a head hash signature 226 that matches the computed hash signature, has a tail hash signature 244 that matches the head hash signature 226, and has a sequence number 224 larger than any of the sequence numbers in the previously processed consistency point. If the selected write record is not valid, the selected write record is a hole.

If a hole is found (decision step 535), the remote agent 85 pauses the scan (step 540) and repeats step 530 through 540 until no holes are found in the write records associated with the consistency point. After a predetermined time delay, the scan is resumed where it paused. Typically, the hole is filled after the pause of step 540. In the event that the hole is not filled after the pause of step 540, the remote agent 85 informs the replication coordinator 75 that a persistent hole exists in the remote replication volume 90. The replication coordinator 75 can, for example, force the application hosts 25 to issue a write to fill the hole or declare a consistency point to force the application hosts 25 to flush buffers, filling the hole.

When all write records in a consistency point data set have arrived at the remote replication volume 90, no holes are found (decision step 535). The remote agent 85 has now validated the write records associated with the consistency point, identifying a consistency point update transaction. In one embodiment, the remote agent 85 further determines whether updates in one consistency point had occupied a consecutive log region, and whether the sequence numbers of the updates are consecutive and increasing. If not, the remote agent 85 pauses the scan then rescans from the last processed transaction.

The remote agent 85 writes the consistency point update transaction to the remote storage device 60 as an atomic unit (step 545). That is, the remote agent 85 does not release the disk space for that consistency point update transaction until all write records in the consistency point update transaction have been written to the remote storage device 60. Consequently, remote data copies are application consistent at all times even in failure cases. The remote agent 85 transmits an acknowledgement to the local replication volume 70 that the write process is complete (step 550). The local replication volume 70 frees space associated with the consistency point update transaction (step 555). The remote replication volume 90 frees space associated with the consistency point data set (step 565). Consequently, the local replication volume 70 and the remote replication volume 90 are sized to accommodate the space required by one to a few consistency point data sets, requiring relatively little disk space.

In one embodiment, system 10 comprises an on-demand initiation of a consistency point declaration. In this embodiment, the consistency point declaration is triggered at the request of the remote agent 85. The remote agent 85 chooses to send a demand for a consistency point after the remote replication volume 90 has accumulated at least X-bytes of new write records not associated with a consistency point data set. A predetermined value for X is set to achieve an optimum range in frequency of consistency point declarations. When the replication coordinator 75 receives such a demand, the replication coordinator 75 coordinates with the application hosts 25 to declare a consistency point. This embodiment maximizes system capability and minimizes performance impact on the application hosts 25.

It is to be understood that the specific embodiments of the invention that have been described are merely illustrative of certain applications of the principle of the present invention. Numerous modifications may be made to the system and method for creating an application-consistent remote copy of data using remote mirroring described herein without departing from the spirit and scope of the present invention.

What is claimed is:

1. A method of creating an application-consistent remote copy of data using remote mirroring, comprising:

registering at least one of a plurality of application hosts associated with the application as an application-consistent host group;

intercepting a write request from at least one of a plurality of the application hosts;

appending the intercepted write request as a write record in a write record format to a local log in a local replication volume, said record format comprising content-dependent hash head and tail signatures and at least one uniquely verifiable data field;

instructing the application hosts to prepare a consistency point, said preparation including at least quiescing application updates;

generating a consistency point record to identify a set of write records comprising a consistency point data set, said consistency point being appended to said write record;

replicating the write records and the consistency point records to a remote log in a remote replication volume, said records being written in a consecutive region of said remote log;

scanning the remote log for the consistency point record until all the data associated with the consistency point has been replicated;

verifying the validity of a content of each of the write records in the remote log, said validity being determined based on criteria selected from the group consisting of: valid value boundaries, said hashed head and tail signatures and a sequence number contained in one of said at least one uniquely verifiable data fields;

generating a validated consistency point update transaction after all of said write records have been replicated and validated, said validated consistency point record including at least a last sequence number generated; and writing the validated write packets in a sequential fashion and the validated consistency point update transaction to a remote storage device to generate an application-consistent remote copy of the consistency point data set, said validated write packets being written in a fashion independent of a manner in which said write packets were replicated.

2. The method of claim 1, wherein the write record format further comprises any one or more of:

a request ID;

an intercept agent ID;

a timestamp;

a hash bock starting offset, S;
a disk block address; and
data from the write request.

3. The method of claim 2, wherein the timestamp is used by a remote agent to identify the write records and the consistency point records.

4. The method of claim 1, wherein the sequence number is used by a remote agent to identify the write records and the consistency point records.

5. The method of claim 1, wherein the sequence number increases sequentially.

6. The method of claim 2, wherein the hash block starting offset is dynamically and randomly generated.

7. The method of claim 2, wherein the head hash signature and the tail hash signature are calculated as hash values of the timestamp, the sequence number, the intercept agent ID, and a predetermined number, N, bytes of the data starting at the hash block starting offset, S.

8. The method of claim 2, further comprising combining an append-only circular log disk layout and the data record format with the content-dependent head hash signature and the tail hash signature hash signature, and uniquely verifiable fields, to allow a remote data processing agent to extract data and to generate a remote copy in a consistency-preserving fashion.

9. The method of claim 8, wherein combining the append-only circular log disk layout comprises appending records at the end of circular log, immediately following a previously appended record.

10. The method of claim 8, wherein the append-only circular log comprises one or more consistency point data sets.

11. The method of claim 10, further comprising deleting each consistency point data set after being written from the remote log in the remote replication volume to the remote storage.

12. The method of claim 1, wherein instructing the application hosts to prepare the consistency point comprises the application hosts completing transient transactions.

13. The method of claim 1, wherein instructing the application hosts to prepare the consistency point comprises the application hosts flushing data in write buffers to the local storage device.

14. The method of claim 1, wherein the consistency point record comprises any one or more of:
a consistency point head hash signature;
a consistency point tail hash signature;
an intercept agent ID;
a consistency point timestamp;
a consistency point sequence number;
a hash block starting offset, S;
a last timestamp of the consistency point data set; and
a last sequence number of the consistency point data set.

15. The method of claim 1, wherein scanning the remote log comprises looking for areas of unreplicated data.

16. The method of claim 15, wherein scanning the remote log comprises pausing until the areas of unreplicated data are filled.

17. The method of claim 1, wherein after writing the validated consistency point update transaction deleting the write records in the consistency point data set and the consistency point update transaction.

* * * * *